US009262408B2

(12) United States Patent
Tanaka et al.

(10) Patent No.: US 9,262,408 B2
(45) Date of Patent: Feb. 16, 2016

(54) MACHINE TRANSLATION APPARATUS, MACHINE TRANSLATION METHOD AND COMPUTER PROGRAM PRODUCT FOR MACHINE TRANSLATION (75) Inventors: Hiroyuki Tanaka, Kanagawa-ken (JP); Tetsuro Chino, Kanagawa-ken (JP); Satoshi Kamatani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 13/237,016

(22) Filed: Sep. 20, 2011

(65) Prior Publication Data
US 2012/0209587 A1    Aug. 16, 2012

(30) Foreign Application Priority Data
Feb. 16, 2011    (JP) .................................. 2011-031240

(51) Int. Cl.
G06F 17/28    (2006.01)
G06F 17/20    (2006.01)
G06F 17/30    (2006.01)
G06Q 10/10    (2012.01)

(52) U.S. Cl.
CPC .................. *G06F 17/2809* (2013.01)

(58) Field of Classification Search
CPC ..... G06F 17/28; G06F 17/2809; G06F 17/20; G06F 17/30; G06Q 10/10
USPC ............................................ 704/1–10; 707/4
See application file for complete search history.

(56) References Cited

U.S. PATENT DOCUMENTS 5,987,402 A * 11/1999 Murata ................. G06F 17/289
704/2
6,256,630 B1 * 7/2001 Gilai ................. G06F 17/30654
6,952,665 B1 * 10/2005 Shimomura ........ G06F 17/2872
704/10
7,107,204 B1 * 9/2006 Liu ........................ G06F 17/273
704/2

(Continued)

FOREIGN PATENT DOCUMENTS

| JP | 07-141383 | 6/1995 |
| JP | 2002-366545 | 12/2002 |
| JP | 2010-186339 | 8/2010 |

OTHER PUBLICATIONS

Koehn, Statistical Machine Translation, Cambridge University Press, Chapter 7, Language Models, 2010.

(Continued)

*Primary Examiner* — Pierre-Louis Desir
*Assistant Examiner* — Seong Ah A Shin
(74) *Attorney, Agent, or Firm* — Amin, Turocy & Watson, LLP (57) ABSTRACT According to one embodiment, a machine translation apparatus includes an input device which inputs a first language sentence; an additional information acquisition unit which acquires a first user or a current location of the first language sentence as a first additional information; a reference data storage device which stores second language reference data that are the relationships between second language sentences and at least one of a second user and a second user usage location of the second language sentences as a second additional information; a text data acquisition unit which acquire second language text data from the second language reference data including second additional information being the same at least one part of the first additional information; and a translation unit which translates the first language sentence to a second language sentence by using the second language text data.

9 Claims, 10 Drawing Sheets

(56) References Cited

U.S. PATENT DOCUMENTS

| | | | | |
|---|---|---|---|---|
| 7,249,012 | B2* | 7/2007 | Moore | G06F 17/2827 704/2 |
| 7,650,283 | B2* | 1/2010 | Mizutani | G10L 15/22 704/2 |
| 7,904,291 | B2 | 3/2011 | Kamatani et al. | |
| 7,974,831 | B2* | 7/2011 | Kamatani | G06F 17/2872 704/2 |
| 8,185,377 | B2* | 5/2012 | Zhou | G06F 17/28 704/7 |
| 8,271,260 | B2* | 9/2012 | Wong | G06F 17/28 704/2 |
| 2002/0042790 | A1* | 4/2002 | Nagahara | G06F 17/30899 |
| 2004/0243392 | A1* | 12/2004 | Chino et al. | 704/7 |
| 2005/0049851 | A1* | 3/2005 | Watanabe | G06F 17/2827 704/2 |
| 2009/0204386 | A1* | 8/2009 | Seligman | G06F 17/2755 704/2 |
| 2010/0161311 | A1* | 6/2010 | Massuh | G06F 17/3087 704/7 |
| 2010/0205541 | A1* | 8/2010 | Rapaport | G06Q 10/10 715/753 |
| 2012/0221323 | A1 | 8/2012 | Sumita et al. | |

OTHER PUBLICATIONS

Koehn, et al. Experiments in Domain Adaptation for Statistical Machine Translation, Proceedings of the Second Workshop on Statistical Machine Translation, Prague, Czech Republic, pp. 224-227, 2007.

Office Action of Notification of Reasons for Refusal for Japanese Patent Application No. 2011-031240 Dated May 16, 2014, 5 pgs.

* cited by examiner

FIG. 1

| Gender | Year of birth | Language | Latitude | Longitude | ... |
|---|---|---|---|---|---|
| Woman | 1993 | English | 35.39622 | 139.46467 | ... |

FIG. 2A

| Generation (or Age group) | Category of facilities | ... |
|---|---|---|
| 10 | Restaurant | ... |

FIG. 2B

| ID | Candidate for translated sentence | Confidence score |
|---|---|---|
| 1 | それはよさそうですね。(It looks good.) | 0.358 |
| 2 | これは良さそうですね。(This looks good.) | 0.323 |
| ... | ... | ... |
| 6 | これ美味しそう！(This looks delicious!) | 0.277 |
| 7 | うまそう—！(What a nice food!) | 0.270 |
| 8 | おいしそう—！(What a delicious food!) | 0.268 |
| 9 | おいしそうだね！(What a delicious food, don't you?) | 0.265 |
| ... | ... | ... |
| 16 | 似合ってるんじゃない (It suit you very well!) | 0.228 |
| 17 | かわいい—！(It's lovely !) | 0.202 |
| 18 | いいんじゃない (It's OK!) | 0.189 |
| ... | ... | ... |

FIG. 3

| Japanese text data | Additional information | | | | | | |
|---|---|---|---|---|---|---|---|
| | Gender | Year of birth | Language | Generation (or Age group) | Latitude | Longitude | Category of facilities | ... |
| 取り置きしてもらえますか？ (Do you reserve it?) | Woman | 1983 | 日本語 (Japanese) | 20 | 35.39622 | 139.46467 | Clothing store | ... |
| 荷物は自分で運ぶで。 (I carry my bags by myself.) | Man | 1976 | 日本語 (Japanese) | 40 | 40.735237 | -73.991559 | Hotel | ... |
| 今日のおすすめとかってありますか？ (What is today's special menu?) | Woman | 1976 | 日本語 (Japanese) | 30 | 36.143732 | 115.268598 | Restaurant | ... |
| ... | ... | ... | ... | ... | ... | ... | ... | ... |

Attributes: Gender, Year of birth, Language
Some identity information: Generation, Latitude, Longitude, Category of facilities

| |
|---|
| 今日のおすすめとかってあります？<br>(What is today's special menu?) |
| あまり辛くない料理がいいんですけど、ありますか？<br>(I like a dish which is not so hot. Do you have it?) |
| ねー一緒に何にする？<br>(What do you want to eat?) |
| これ超おいしそうじゃん！<br>(This looks so delicious!) |
| これおいしそうだねー。<br>(This looks delicious.) |
| ..... |

FIG. 5B

| Japanese text data | Degree of Similarity |
|---|---|
| 今日のおすすめとかってあります？<br>(What is today's special menu?) | 0.05 |
| あまり辛くない料理がいいんですけど、ありますか？<br>(I like a dish which is not so hot. Do you have it?) | 0.10 |
| ねー一緒に何にする？<br>(What do you want to eat?) | 0.09 |
| これ超おいしそうじゃん！<br>(This looks so delicious!) | 0.55 |
| これおいしそうだねー。<br>(This looks delicious.) | 0.50 |
| ..... | ..... |

FIG. 5C

| 日本語テキスト |
|---|
| これ超おいしそうじゃん。(This looks so delicious!) |
| これおいしそうだねー。(This looks delicious.) |
| おいしそうな！(What a delicious food, don't you?) |
| おいしそう！(What a delicious food!) |
| おいしそうですね。(It looks delicious.) |
| これは美味しそうね。(It suit you very well!) |
| すっごくおいしそう！(What a nice delicious food!) |
| ..... |

| Word bigram | | Logarithmic probability |
|---|---|---|
| おいしそう(oishisou) | — | 0.310 |
| おいしそう(oishisou) | だね(dane) | 0.142 |
| おいしそう(oishisou) | ! | 0.207 |
| — | ! | 0.147 |
| ... | ... | ... |

FIG. 6

| ID | Candidate for translated sentence | Confidence score (before updating) | Adaptive score |
|---|---|---|---|
| 1 | それはよさそうですね。(It looks good.) | 0.358 | 0.093 |
| 2 | これは良さそうですね。(This looks good.) | 0.323 | 0.092 |
| ... | ... | ... | ... |
| 6 | これ美味しそう！(This looks delicious!) | 0.277 | 0.387 |
| 7 | うまそうー！(What a nice food!) | 0.270 | 0.328 |
| 8 | おいしそうー！(What a delicious food!) | 0.268 | 0.457 |
| 9 | おいしそうだね！(What a delicious food, don't you?) | 0.265 | 0.409 |
| ... | ... | ... | ... |
| 16 | 似合ってるんじゃない (It suit you very well!) | 0.228 | 0.103 |
| 17 | かわいいー！(It's lovely !) | 0.202 | 0.148 |
| 18 | いいんじゃない (It's OK!) | 0.189 | 0.115 |
| ... | ... | ... | ... |

FIG. 7A

| ID | Candidate for translated sentence | Confidence score (after updating) |
|---|---|---|
| 8 | おいしそうー！(What a delicious food!) | 0.363 |
| 9 | おいしそうだね！(What a delicious food, don't you?) | 0.338 |
| ... | ... | ... |
| 1 | それはよさそうですね。(It looks good.) | 0.226 |
| ... | ... | ... |

| Second language text data | Attributes | | | | Additional information | | | |
|---|---|---|---|---|---|---|---|---|
| | Gender | Year of birth | Language | Generation (or Age group) | Latitude | Longitude | Category of facilities | ... |
| 取り置きしてもらえますか? (Do you reserve it?) | Woman | 1983 | Japanese | 20 | 35.39622 | 139.46467 | Clothing store | ... |
| 荷物は自分で運ぶんで。 (I carry my bags by myself.) | Man | 1976 | Japanese | 40 | 40.735237 | -73.991559 | Hotel | ... |
| 今日のおすすめとかってあります? (What is today's special menu?) | Woman | 1976 | Japanese | 30 | 36.143732 | -115.268598 | Restaurant | ... |
| ... | ... | ... | ... | ... | ... | ... | ... | ... |
| I missed my flight. | Man | 1994 | English | 10 | 35.77369 | 140.38810 | Airport | ... |
| ... | ... | ... | ... | ... | ... | ... | ... | ... |
| It looks good. | Woman | 1993 | English | 10 | 35.39622 | 139.46467 | Restaurant | ... |

Some identify information

FIG. 10

MACHINE TRANSLATION APPARATUS, MACHINE TRANSLATION METHOD AND COMPUTER PROGRAM PRODUCT FOR MACHINE TRANSLATION

CROSS REFERENCE TO RELATED APPLICATION

This application is based upon and claims the benefit of priority from Japanese Patent Application No. 2011-031240, filed on Feb. 16, 2011; the entire contents of which are incorporated herein by reference.

FIELD

Embodiments described herein relate generally to a machine translation apparatus and associated methods.

BACKGROUND

The popularity of computers continues to grow as performance increases and broadband infrastructures proliferate. Machine translation apparatuses and services that translate input text documents of a source language to text documents of a target language are becoming more popular. Methods for improving accuracy of machine translations are proposed to select translation dictionaries in response to usage scenes, for example, "shopping" and "vehicle" set in advance by a user.

However such methods merely react to the usage scenes classified off-line in advance.

DETAILED DESCRIPTION

According to one embodiment, a machine translation apparatus includes an input device configured to input a first language sentence; an additional information acquisition unit configured to acquire at least one of a first user and a current location of the first language sentence as a first additional information; a reference data storage device configured to store second language reference data that are the relationships between second language sentences and at least one of a second user and a second user usage location of the second language sentences as a second additional information; a text data acquisition unit configured to acquire second language text data from the second language reference data including second additional information being the same at least one part of the first additional information; and a translation unit configured to translate the first language sentence to a second language sentence by using the second language text data.

Various Embodiments will be described hereinafter with reference to the accompanying drawings.

One Embodiment

A machine translation apparatus according to an embodiment translates an English text document (example of a source language) to a Japanese text document (example of a target language). When a Japanese user uses the Japanese text document, the machine translation apparatus acquires the Japanese user's profile data and current (or usage) location as additional information. The apparatus learns adaptive model of machine translation being suitable for the additional information by using reference data. The reference data is that the Japanese text document corresponds to the additional information.

When the apparatus acquires the English text document inputted by an English user and additional information of the English text document, the apparatus obtains Japanese reference data including similar additional information from a reference data storage unit. The apparatus generates an adaptive model representing a trend of machine translation from the Japanese text document of the acquired Japanese reference data.

Methods of generating an adaptive model of machine translation online dynamically can make the apparatus learn the adaptive model flexibly corresponding to a Japanese user's usage scenes.

The apparatus translates an inputted English sentence by a conventional method and calculates a plurality of candidates for the translated sentence and the confidence scores of the candidates.

The apparatus updates the confidence scores by using the adaptive model generated online dynamically and outputs a Japanese sentence as the final result of the machine translation.

(Entire of the Machine Translation Apparatus)

Figure 1:
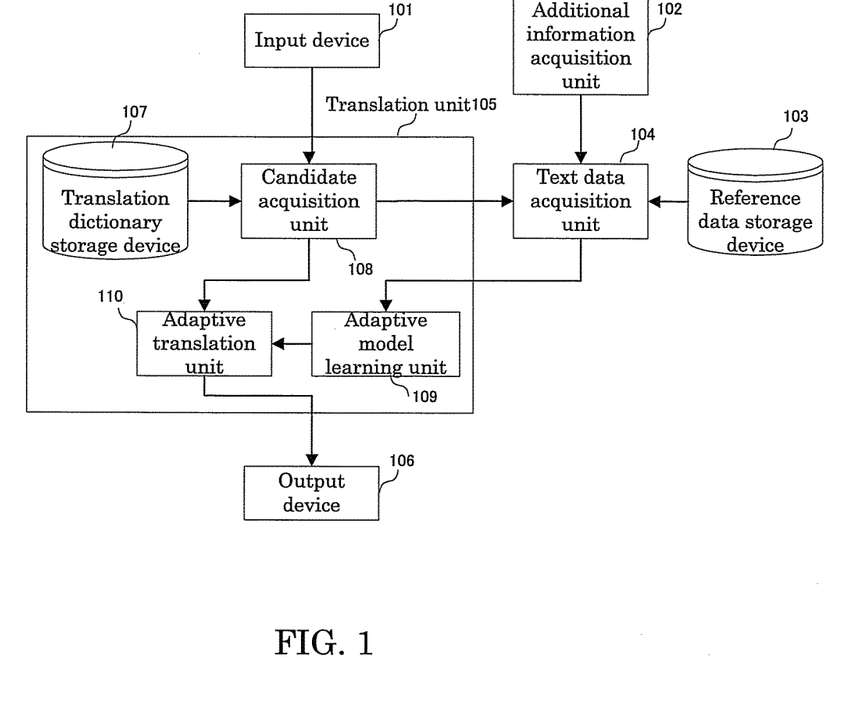
FIG. 1 shows the entire of a machine translation apparatus according to an embodiment.

FIG. 1 shows the entire machine translation apparatus according to an embodiment. The apparatus includes an input device 101 for inputting an English sentence as a source language sentence, an additional information acquisition unit 102 for acquiring at least one of English user and current location of the English sentence as an English additional information, a reference data storage device 103 for storing Japanese reference data that are the relationships between Japanese sentences and at least one of users and usage locations of the Japanese sentences as Japanese additional information, a text data acquisition unit 104 for acquiring Japanese text data from the Japanese reference data including Japanese additional information being the same at least one part of the English additional information, a translation unit 105 for translating the English sentence to a Japanese sentence by using Japanese text data, and an output device 106 for outputting the Japanese sentence.

The translation unit 105 translates the English sentence to the Japanese sentence by using translation dictionary storage device 107. The translation unit 105 includes a candidate acquisition unit 108 for acquiring a plurality of candidates for translated sentence and confidence scores of the candidates, an adaptive model learning unit 109 for learning adaptive model that represents a trend of machine translation by using the Japanese text data acquired by the text data acquisition unit 104, an adaptive translation unit 110 for updating the confidence scores of the candidates by using the adaptive model learned by the adaptive model learning unit 109.

(Input Unit)

The input device 101 inputs English text sentence of source language. The input device 101 can be a keyboard, pointing device, handwritten character recognition, optical character reader (OCR), speech recognition, etc.

(Additional Information Acquisition Unit)

The additional information acquisition unit 102 acquires at least one of English user's profile data and current location of the English sentence as an English additional information. The English user's profile data represent the English user's gender, age, occupation, interest, language, etc. The English user inputs the English user's profile data to the machine translation apparatus once when the English user is registered.

Figure 2A:
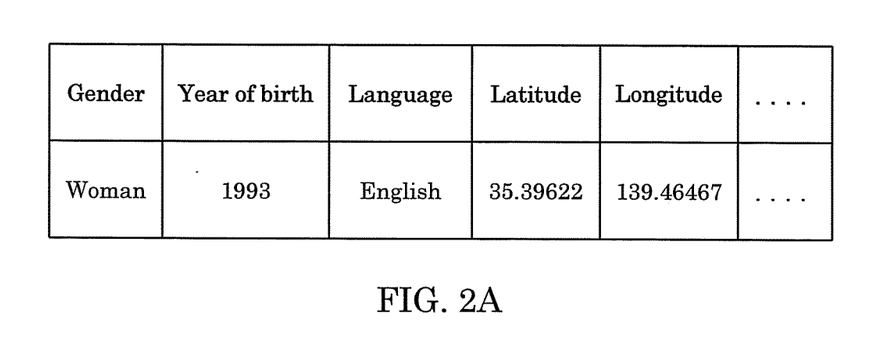
FIGS. 2A and 2B show additional information according to the embodiment.

The machine translation apparatus further includes Global Positioning System (GPS) sensor that acquires current location of the English sentence. FIG. 2A shows additional information when the input unit inputs an English sentence "It looks good." The additional information are acquired gender, year of birth and language as the English user's profile data. The additional information are acquired latitude and longitude as the current location.

The additional information acquisition unit 102 analyses the English user's profile data and current location to acquire further additional information. For example, when the unit 102 checks the latitude and the longitude with real map data, the unit 102 acquires the English user's current facility category "restaurant", city name, etc as the other additional information (shown in FIG. 2B). The unit 102 calculates the user's generation (or age group) "10" based on the user's birth year (1993) and current year (2011).

(Candidate Acquisition Unit)

The candidate acquisition unit 108 translates the English text sentence to a Japanese text sentence. Concretely, the unit 108 translates the English text sentence by using translation dictionary storage device 107 and outputs a plurality of candidates for translated sentence (candidate group for translated sentence) and confidence scores of the candidates that represents likelihoods of the candidates. The machine translation uses one or more of a transfer method, an example-based method, a statistics-based method, an intermediate-language method, etc.

Figure 3:
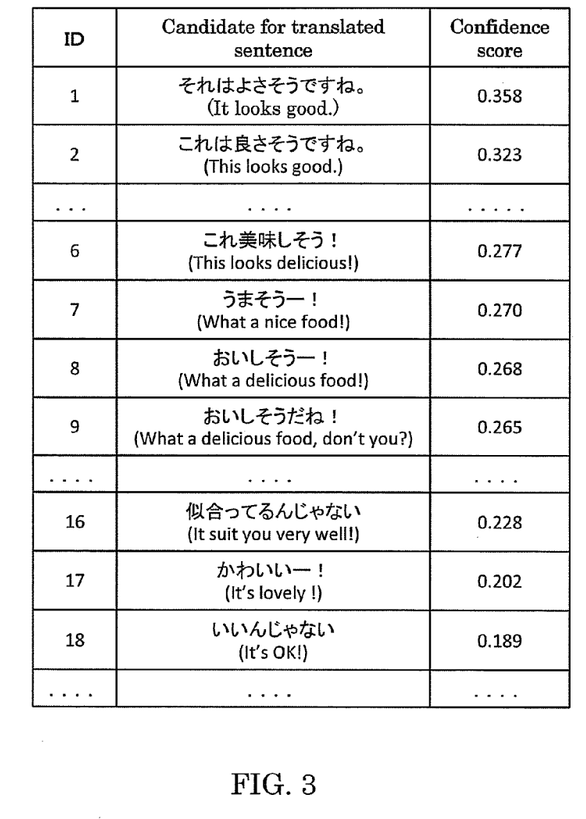
FIG. 3 shows candidates for translated sentence and confidence scores of the candidates.

FIG. 3 shows candidates for translated Japanese sentence and confidence scores of the candidates when the input device 101 inputs the English sentence "It looks good."

(Reference Data Storage Unit)

The reference data storage device 103 stores Japanese reference data that are the relationships between Japanese sentences and at least one of users and usage locations of the Japanese sentences as Japanese additional information. The reference data is utilized for learning data when the adaptive model learning unit 109 calculates the adaptive model.

Figure 4:
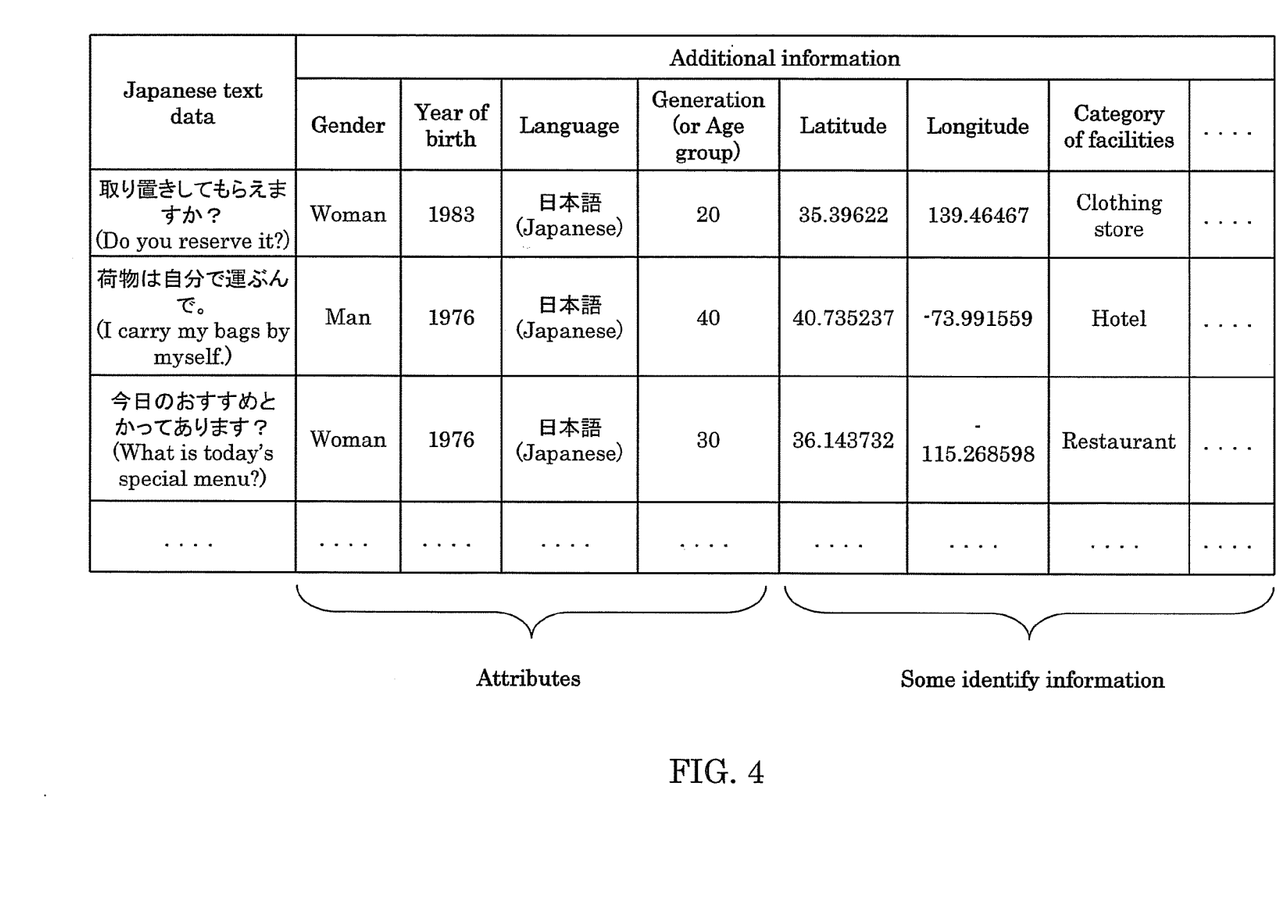
FIG. 4 shows Japanese reference data according to the embodiment.

FIG. 4 shows examples of Japanese reference data. The Japanese reference data is utilized as another reference data of another Japanese user's machine translation apparatus.

For example, when a native Japanese user inputted a native Japanese text sentence to another machine translation apparatus, the relationship between the native Japanese text sentence and at least one of the native Japanese user and usage locations of the native Japanese text sentences, as Japanese additional information, is utilized for native Japanese reference data, as past history of the native Japanese reference data. The native Japanese reference data is stored by the share server. The share server is located in Social Networking Service (SNS) server. In this way, multiple native languages reference data are easily stored in SNS server. The device 103 acquires the native Japanese reference data from the share server in SNS server.

(Text Data Acquisition Unit)

The text data acquisition unit 104 utilizes a plurality of candidates for the translated sentence acquired by the unit 108 and the English additional information corresponding to the candidates, and acquires Japanese text sentence for learning the adaptive model from the Japanese reference data stored by the device 103.

First, the unit 104 acquires Japanese reference data including Japanese additional information being the same at least one part of the English additional information. In this case, the unit 104 determines the identity between Japanese additional information and English additional information based on not only all additional information but also "gender", "generation (or age group)" and "category of facilities".

Second, the unit 104 calculates the degree of the similarity between the Japanese text sentences of the Japanese reference data and the candidates for translated sentence. When the degree is more than a threshold value, the unit 104 outputs the Japanese text sentence to the unit 109.

Figure 2B:
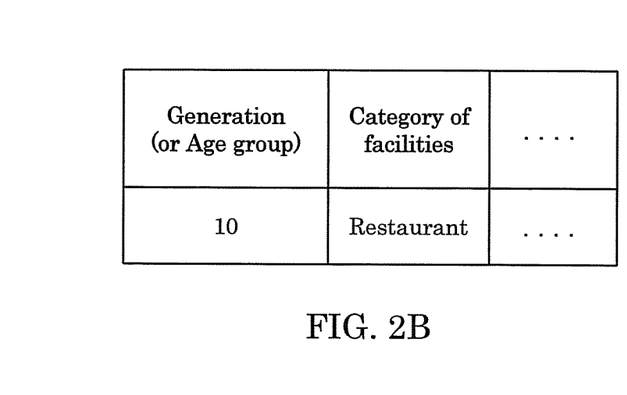
Figure 5A:
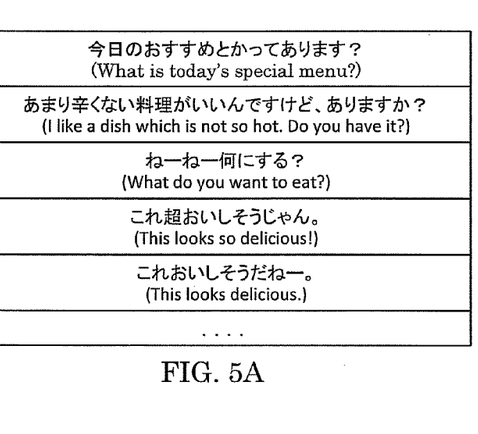
FIGS. 5A to 5C show Japanese text data that is used for learning adaptive model according to the embodiment.

In the case of FIGS. 2A and 2B, the unit 104 acquires the Japanese reference data having Gender is "Woman", Generation is "10", and, Category of facilities is "Restaurant" from the device 103. FIG. 5A shows Japanese text data acquired from the device 103.

Figure 5B:
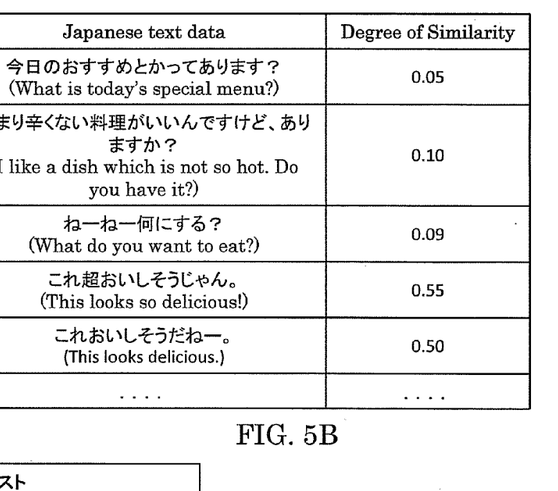

The unit 104 calculates the degree of the similarity between the Japanese text data shown in FIG. 5A and the candidates for translated sentence shown in FIG. 3. FIG. 5B shows the calculated degree of the similarity.

Figure 5C:
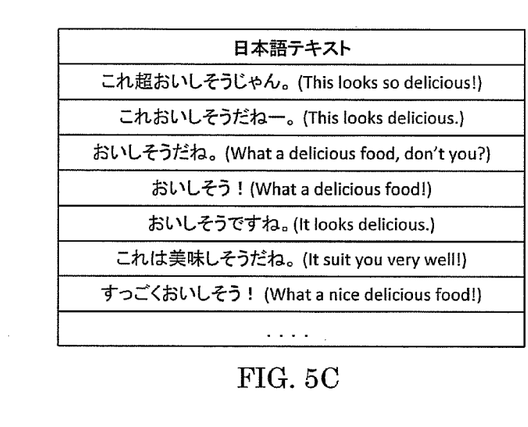

The unit 104 acquires the Japanese text data having the degree shown in FIG. 5B is more than a predetermined threshold value and outputs the Japanese text data to the unit 109. The FIG. 5C shows the Japanese text data outputted by the unit 104, when the threshold value is set as "0.4".

The method of calculating the degree of the similarity between Japanese text data and the candidates for translated sentence is described. The method uses Edit Distance, Word Error Rate, Translation Error Rate, Bilingual Evaluation Understudy (BLEU), or another barometer using n-gram information. In the embodiment, the degree of the similarity is the value that the degree of the coincidence between character 3(tri)-grams of the Japanese text sentence and 3-grams of the candidates is divided by the numbers of 3-grams of the both sentences.

For example, when "これおいし そうだね─○ (Koreoishi-soudane-.)" and "おいし そうだね─○ (oishisoudane-.)" is separated to 3-grams, the first sentence represents "これお(koreo)、れおい(reoi)、おいし(oishi)、いしそ(ishiso)、しそう(shisou)、そうだ(souda)、うだね(udane)、だね.(dane-)、ね─○(ne-.)", and the second sentence represents "おいし(oishi)、いしそ(ishiso)、しそう(shisou)、そうだ(souda)、うだね(udane)、だね！(dane!)".

The two sentences have 5 common 3-grams, that is, "おいし(oishi)", "いしそ(ishiso)", "しそう(shisou)", "そうだ(souda)", and "うだね(udane)". The degree of the similarity is "5/10=0.5".

The unit 104 calculates the degree of the similarity between each Japanese text sentence and the candidates for translated sentence using the above method. The maximum value of the calculated degree of the similarity is the final degree of the similarity on the Japanese text sentence.

In this embodiment, the unit 104 determines the identity between Japanese additional information and English additional information based on, for example, "gender", "generation (or age group)" and "category of facilities", but is not limited to, based on the all additional information.

(Adaptive Model Learning Unit)

The adaptive model learning unit 109 learns the adaptive model that represents a trend of machine translation by using the Japanese text data acquired by the unit 104. In the embodiment, the adaptive model is Word Bigram Language Model learned by adaptive model sentence group. The Word Bigram Language Model may be used as well, including those described in Philipp Koehn, "Statistical Machine Translation," Cambridge University Press, 2010, Chapter 7, the entire contents of which is incorporated herein by reference.

Figure 6:
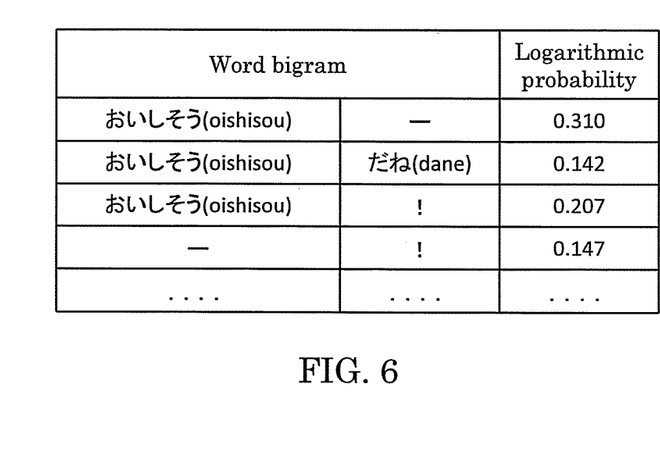
FIG. 6 shows the adaptive model.

FIG. 6 shows the adaptive model of the word bigram represented by the logarithmic probability.

Examples of other adaptive models include N-gram Language model, Hidden Markov Model, Maximum Entropy Model, Weighted Finite State Transducer, Conditional random field, Log-linear model, or another probability model, or Term Frequency—Inverse Document Frequency, or another method of extracting characteristic word.

(Adaptive Translation Unit)

The adaptive translation unit 110 updates the confidence stores of candidates for translated sentence acquired by the unit 108, by using the adaptive model learned by the unit 109. For example, the unit 110 acquires the average of the confidence score acquired by the unit 108 and the adaptive score calculated by the adaptive model, as the confidence score after updating.

Figure 7A:
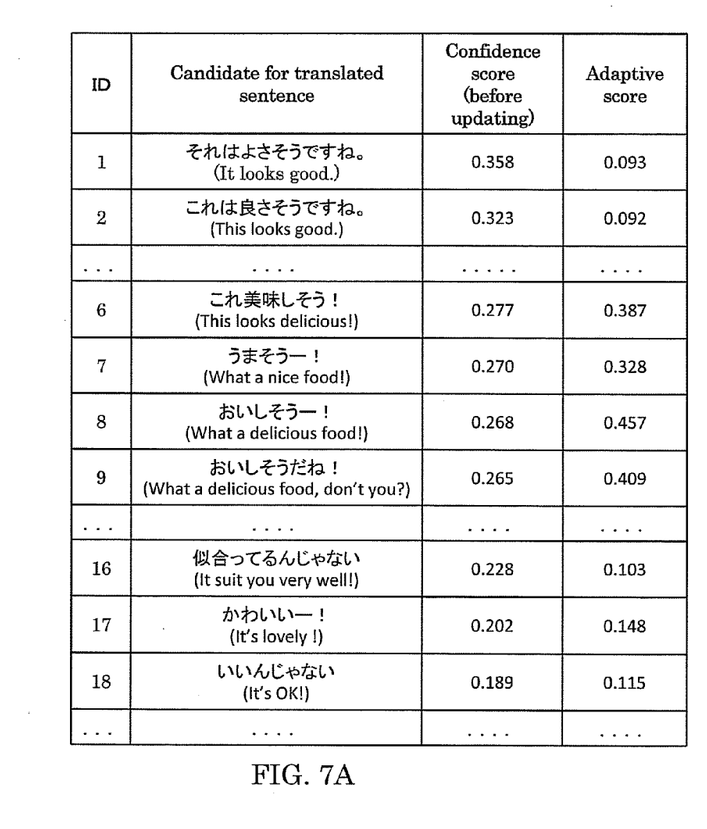
FIGS. 7A and 7B show the confidence scores of the candidates.
Figure 7B:
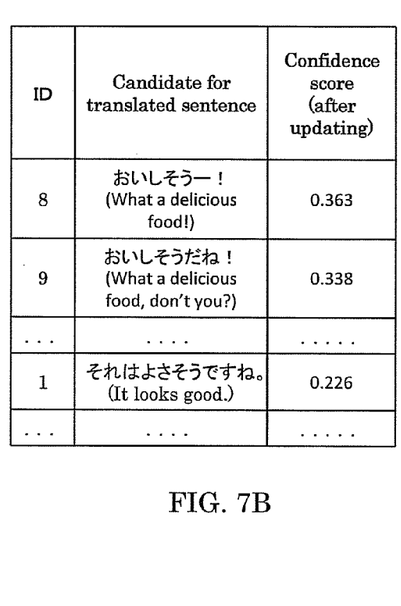
Figure 8:
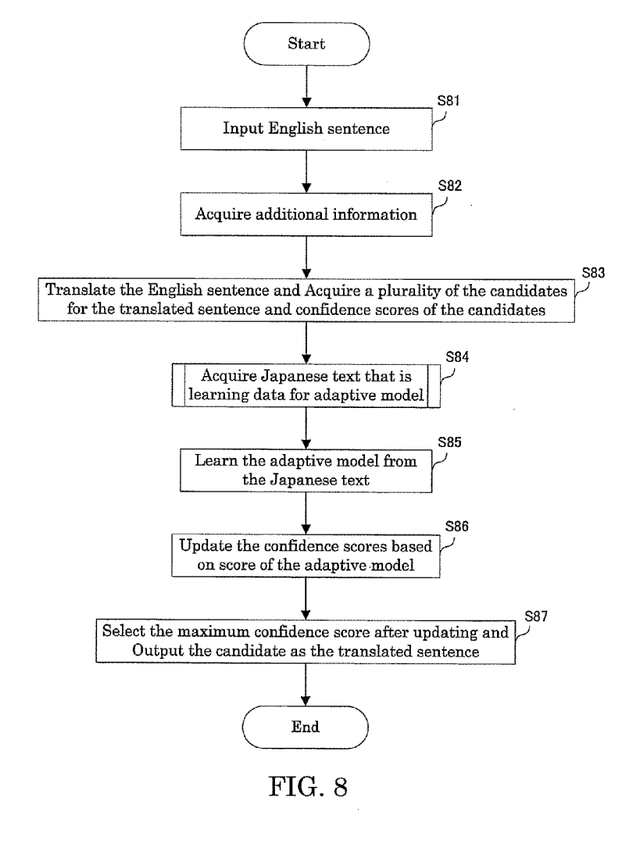
FIG. 8 illustrates a flow chart of the operation of the machine translation apparatus.

FIG. 7A shows the case of calculating the adaptive score of the candidates shown in FIG. 3 using the adaptive model. The adaptive score of the sentence "おいしそう—! (What a delicious food!)" shown in ID8 of FIG. 8 is calculated "0.310+0.147=0.457", using the adaptive model of "(おいしそう (oishisou), —)" and "(—, !)" shown in FIG. 6. The unit 110 calculates the confidence score after updating, using the confidence score before updating and adaptive score shown in FIG. 7A. FIG. 7B shows a list of the candidates for translated sentence in order of large confidence score before updating. In the case of FIG. 7B, the confidence score after updating of ID1 " それはよ さそうですね。(It looks good.)" is "(0.358+0.093)/2=0.226", and the confidence score after updating of ID8 " おいしそう—! (What a delicious food!)" is "(0.268+0.457)/2=0.363".

As mentioned above, when the confidence score is updated by using the adaptive score, the confidence score of the candidate that is suitable for the additional information having Gender is "Woman", Generation is "10", and, Category of facilities is "Restaurant" becomes bigger.

Updating the confidence score by using the adaptive model learned online dynamically can acquire the result of the machine translation being suitable for at least one of the user's profile data and the current location of the current additional information. For example, when "Man" inputs "It looks good.", the confidence score of "うまそう—! (What a delicious food!)" shown in ID7 of FIG. 7A becomes the biggest. When "It looks good." is inputted in "clothing store", the confidence score of "'かわいい —! (It's lovely!)" shown in ID17 of FIG. 7A becomes the biggest.

(Output Unit)

The output device 106 outputs the candidates having the biggest confidence score updated by the unit 110, as the final result of the machine translation. The output style of the device 106 is an image output of a display, a print output of a printer, a speech-synthesis output of a speech-synthesis, etc.

(Flowchart)

FIG. 8 illustrates a flow chart of the operation of the machine translation apparatus. The device 101 input an English text sentence of source language (Step 81). The unit 102 acquires the English user's profile data and current location as additional information on the inputted English text sentence (Step 82). The unit 108 translates the inputted English text sentence to Japanese and acquires a plurality of candidates for translated sentence and confidence scores of the candidates (Step 83). The unit 104 acquires Japanese text data using learning of adaptive mode, from Japanese reference data stored by the device 103, by using the candidates acquired by unit 108 and English additional data (Step 84).

The unit 109 learns the adaptive model by using the Japanese text data acquired by the unit 104 (Step 85). The adaptive translation unit 110 updates the confidence scores of the candidates by using the adaptive model learned by the unit 109. The output device 106 outputs the candidates having the biggest confidence score updated by the unit 110, as the final result of the machine translation (Step 87).

Figure 9:
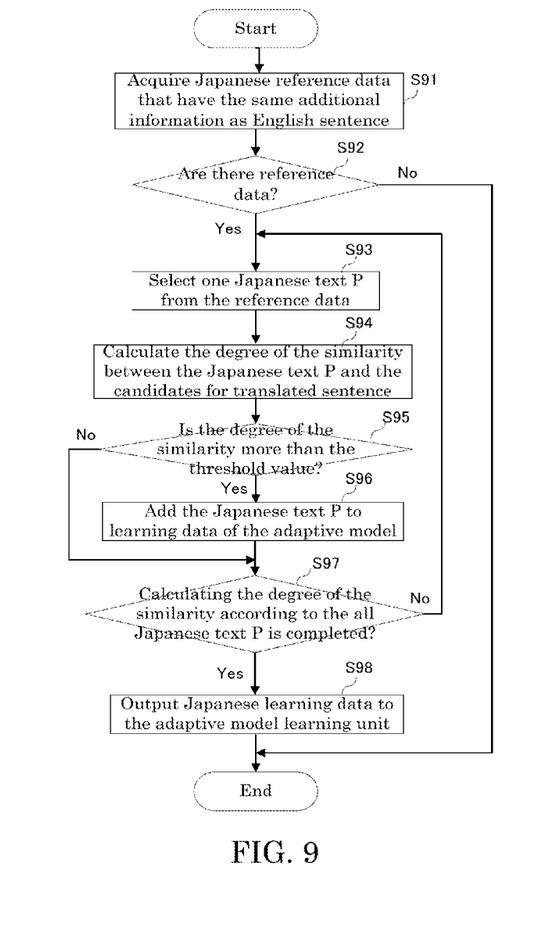
FIG. 9 illustrates a detailed flow chart of Step 84.

FIG. 9 illustrates a detail flow chart of Step 84. The unit 104 acquires the Japanese reference data including Japanese additional information being the same at least one part of the English additional information of the English text sentence, from the device 103 (Step 91). If the Japanese reference data is acquired (reference "Yes" of Step 92), then the unit 104 selects one Japanese text data P from the Japanese reference data (Step 93). The unit 104 calculates the degree of the similarity between the Japanese text data P and the candidate group C for translated sentence (Step 94). If the calculated degree is more than or equal to the threshold value (reference "Yes" of Step 95), the unit 104 adds the Japanese text data P to the learning data of the adaptive model (Step 96). On the other hand, if the calculated degree is less than the threshold value (reference "No" of Step 95), the unit 104 checks the calculation on the other Japan text data P (Step 97). If calculating the degree of the similarity according to the all Japanese text P is completed (reference "Yes" of Step 97), the unit 104 outputs the acquired the Japanese learning data to the unit 109 (Step 98).

(Advantage)

The machine translation apparatus according to the embodiment online dynamically generates the adaptive model representing a trend of machine translation from the Japanese text data corresponding to the additional information. The apparatus can translate suitably for the English user's profile and current location.

The method of automatically generating the adaptive model from the additional information by acquired by the machine translation apparatus can save the trouble that the user preliminarily selects the usage scene.

The apparatus uses the reference data, including Japanese sentences of another user and usage location of the other user, stored in the share server or SNS server. The apparatus uses native Japanese sentences and usage locations of the native Japanese user.

(First Variation of the Embodiment)

The device 103 according to a first variation of the embodiment furthermore stores the English sentence inputted by the device 101 and the English additional information acquired by the unit 102, as the English reference data. The English reference data is used for translating Japanese to English.

Figure 10:
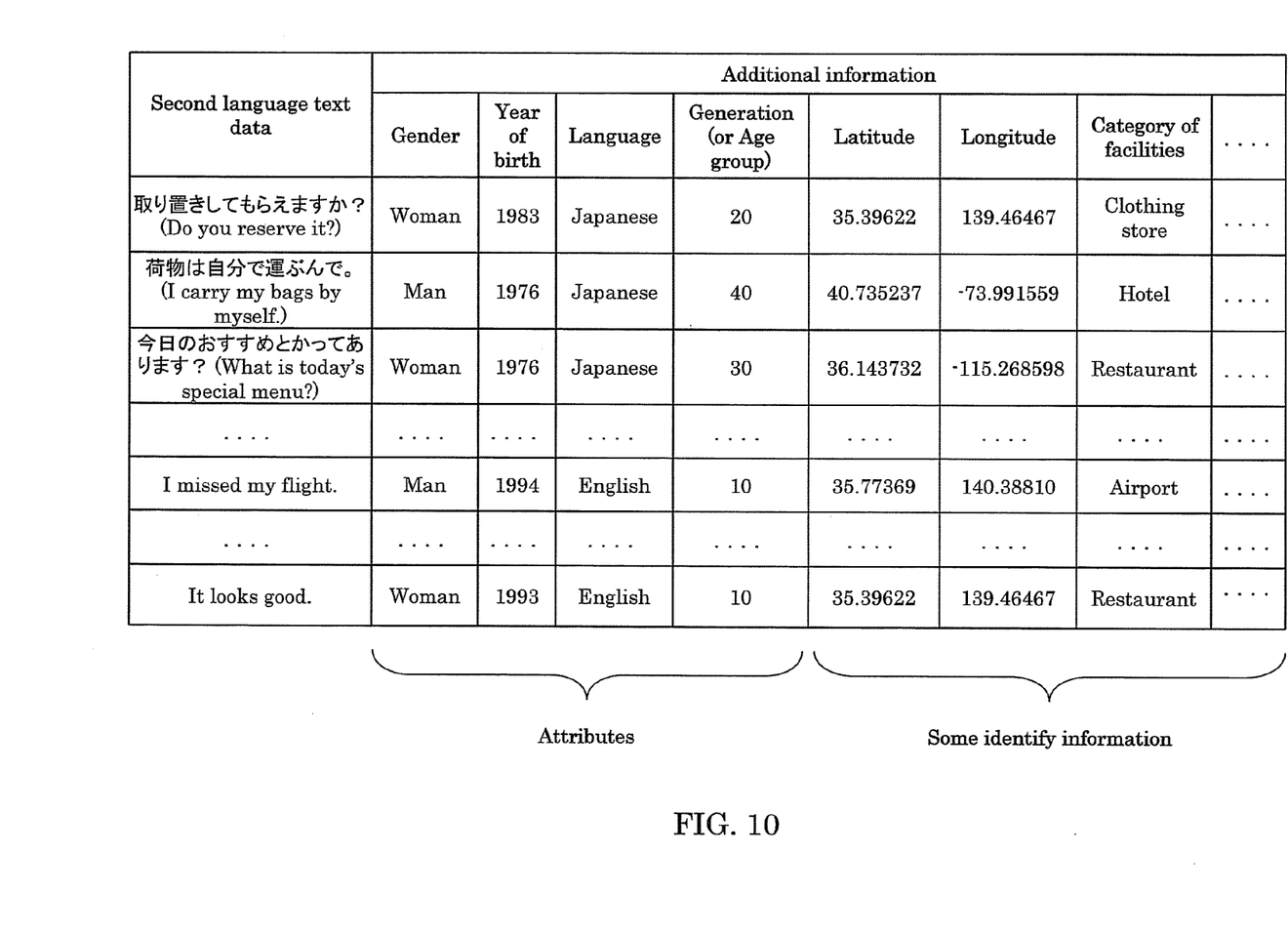
FIG. 10 shows a plurality of languages reference data according to first variation of the embodiment.

The English reference data is stored in the share server or SNS server via network. The English reference data that is used for learning an adaptive model of Japanese user is collected without cost. FIG. 10 shows a plurality of languages reference data stored by the device 103.

(Second Variation of the Embodiment)

To acquire the additional information uses sensing data including, for example, an acceleration sensor, a gyro sensor, environment light sensor, blood pressure sensor, etc. and picture images of camera device.

The method of extracting information on user's behavior can be used as well, including those described in US Patent Application Publication 2010/0070235, the entire contents of which are incorporated herein by reference. The method extracts information on user's behavior, for example getting in a car, riding in a train, running, walking, or standing. The extracted information is used for the additional information.

When the machine translation apparatus has a communication unit, the apparatus acquires the base-station ID as the additional information on usage place of the user.

(Third Variation of the Embodiment)

In the embodiment, the unit 108 acquires a plurality of candidates for the translated sentence and the confidence scores of the candidates and the unit 110 updates the confidence scores. On the other hand, in a third variation of the embodiment, In-Domain Language Model can be used as well, including those described in Philipp Koehn, "Experiments in Domain Adaptation for Statistical Machine Translation", Proceedings of the Second Workshop on Statistical Machine Translation, Prague, Czech Republic, June 2007, p. 224-227, the entire contents of which is incorporated herein by reference. Using the In-Domain Language Model as the adaptive model learned by the unit 109 can directly calculate the final confidence score.

(Fourth Variation of the Embodiment)

The Japanese reference data stored by the device 103 is not only text format but also speech data format. When the adaptive model is learned, the unit 104 extracts the Japanese text data from the speech data with speech recognition.

(Fifth Variation of the Embodiment)

In the embodiment, the unit 109 learns one adaptive model. On the other hand, in a fifth variation of the embodiment, the unit 109 learns a plurality of adaptive models from the reference data. For example, the unit 109 learns each adaptive model from the reference data of the same age group or the reference data of the same location. The unit 109 calculates the confidence score by adding the learned adaptive models with weight.

According to the machine translation apparatus of at least one embodiment described above, the apparatus is able to translate in response to current usage scene of user.

The flow charts of the embodiments illustrate methods and systems according to the embodiments. It will be understood that each block of the flowchart illustrations, and combinations of blocks in the flowchart illustrations, can be implemented by computer program instructions. These computer program instructions can be loaded onto a computer or other programmable apparatus to produce a machine, such that the instructions which execute on the computer or other programmable apparatus create means for implementing the functions specified in the flowchart block or blocks. These computer program instructions can also be stored in a non-transitory computer-readable memory that can direct a computer or other programmable apparatus to function in a particular manner, such that the instruction stored in the non-transitory computer-readable memory produce an article of manufacture including instruction means which implement the function specified in the flowchart block or blocks. The computer program instructions can also be loaded onto a computer or other programmable apparatus/device to cause a series of operational steps/acts to be performed on the computer or other programmable apparatus to produce a computer programmable apparatus/device which provides steps/acts for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A machine translation apparatus comprising:
an input device configured to input a first sentence in a first language;
an additional information acquisition unit configured to acquire first additional information relating to a first user, wherein the first additional information comprises a location of the apparatus along with a facility name of the first user, and gender or age information for the first user;
a reference data storage device configured to store plural pieces of second reference data each of which associates a second sentence in a second language with second additional information relating to a second user of the second sentence and a usage location of the second sentence;
a candidate acquisition unit configured to translate the first sentence in the first language to a plurality of candidates, for a translated sentence, in a second language and acquire confidence scores of the candidates;
a text data acquisition unit configured to acquire a plurality of the second sentences from the second reference data stored in the reference data storage device, the plurality of the second sentences being associated with the second additional information each of which is identical with at least a part of the first additional information, the text data acquisition unit configured to determine degrees of similarity between the candidates and the plurality of the second sentences as a function of identifying a correspondence in a number quantity of character n-grams associated with the first sentence and a number quantity of character n-grams associated with each of the plurality of candidates divided by a total number of n-grams that respectively comprise the first sentence and each of the plurality of candidates, and to output a part of the plurality of the second sentences having degrees of similarity equal to or larger than a predetermined value; and
an adaptive model learning unit configured to modify an adaptive model representing a trend of machine translation by using the second sentences output from the text data acquisition unit, wherein the second additional information associated with each output second sentence is identical with at least a part of the first additional information;
an adaptive translation unit configured to update the confidence scores based on an adaptive score derived from the adaptive model and the confidence scores for each candidate, wherein the adaptive translation unit selects one of the candidates based on updated confidence scores, and
an output device configured to output one candidate selected based on the updated confidence scores.

2. The apparatus according to claim 1, wherein
the translation unit includes:
  a candidate acquisition unit configured to translate the first sentence to the second language and acquire a plurality of candidates for a translated sentence and confidence scores of the candidates;
  an adaptive model learning unit configured to learn an adaptive model representing a trend of machine translation by using the acquired one of the second sentences; and
  an adaptive translation unit configured to update the confidence scores of the candidates by using the adaptive model learned by the adaptive model learning unit,
  the text data acquisition unit is configured to acquire the one of the second sentences from the second reference data by using the candidates acquired by the candidate acquisition unit.

3. The apparatus according to claim 1, wherein the second reference data is acquired by another apparatus.

4. The apparatus according to claim 3, wherein said another apparatus is a share server located in an SNS server system, and
  the reference data storage device is configured to acquire the second reference data from the share server in the SNS server system.

5. The apparatus according to claim 1, wherein the second reference data is a past history of reference data of native second language users.

6. The apparatus according to claim 1, wherein the reference data storage device is further configured to store first reference data that associates sentences in the first language with additional information relating to first users of the sentences in the first language and usage locations of the sentences in the first language.

7. The apparatus according to claim 1, wherein
  the current location of the first sentence includes first longitude and first latitude, and
  the usage location of each second sentence includes second longitude and second latitude.

8. A machine translation method comprising:
  inputting a first sentence in a first language;
  acquiring first additional information relating to a first user, wherein the first additional information comprises a location of an apparatus along with a facility name of the first user, and gender or age information for the first user;
  storing plural pieces of second reference data each of which associates a second sentence in a second language with second additional information relating to a second user of the second sentence and a usage location of the second sentence;
  translating the first sentence in the first language to a plurality of candidates, for a translated sentence, in a second language and acquiring confidence scores of the candidates;
  acquiring a plurality of the second sentences from the stored second reference data, the plurality of the second sentences being associated with the second additional information each of which is identical with at least a part of the first additional information;
  determining degrees of similarity between the candidates and the plurality of the second sentences as a function of identifying a correspondence in a number quantity of character n-grams associated with the first sentence and a number quantity of character n-grams associated with each of the plurality of candidates divided by a total number of n-grams that respectively comprise the first sentence and each of the plurality of candidates;
  outputting a part of the plurality of the second sentences having degrees of similarity equal to or larger than a predetermined value; and
  using the second sentences to modify an adaptive model representing a trend of machine translation, wherein the second additional information associated with each output second sentence is identical with at least a part of the first additional information;
  using the adaptive model to update the confidence scores based on an adaptive score derived from the adaptive model and the confidence scores for each candidate,
  selecting one of the candidates based on the updated confidence scores; and
  outputting one candidate based on the updated confidence scores.

9. A computer program product having a non-transitory computer readable medium including programmed instructions for performing a machine translation processing, wherein the instructions, when executed by a computer, cause the computer to perform:
  inputting a first sentence in a first language;
  acquiring first additional information relating to a first user, wherein the first additional information comprises a location of the apparatus along with a facility name of the first user, and gender or age information for the first user;
  storing plural pieces of second reference data t each of which associates a second sentence in a second language with second additional information relating to a second user of the second sentence and a usage location of the second sentence;
  translating the first sentence in the first language to a plurality of candidates, for a translated sentence, in a second language and acquiring confidence scores of the candidates;
  acquiring a plurality of the second sentences from the stored second reference data, the plurality of the second sentences being associated with the second additional information each of which is identical with at least a part of the first additional information;
  determining degrees of similarity between the candidates and the plurality of the second sentences as a function of identifying a correspondence in a number quantity of character n-grams associated with the first sentence and a number quantity of character n-grams associated with each of the plurality of candidates divided by a total number of n-grams that respectively comprise the first sentence and each of the plurality of candidates;
  outputting part of the plurality of the second sentences having degrees of similarity equal to or larger than a predetermined value; and
  using the second sentences to modify an adaptive model representing a trend of machine translation wherein the second additional information associated with each output second sentence is identical with at least a part of the first additional information;
  using the adaptive model to update the confidence scores based on an adaptive score derived from the adaptive model and the confidence scores for each candidate,
  selecting one of the candidates based on the updated confidence scores; and
  outputting one candidate based on the updated confidence scores.

* * * * *